W. A. DOREY.
PROJECTION LENS.
APPLICATION FILED AUG. 24, 1920.
1,410,898. Patented Mar. 28, 1922.
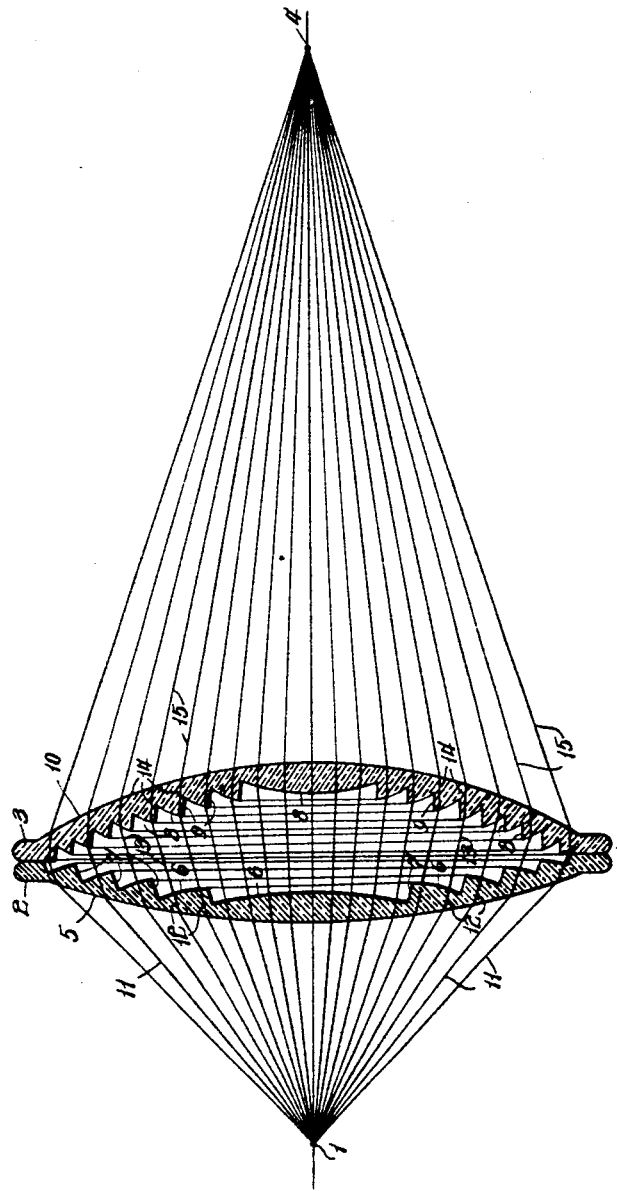
INVENTOR
William A. Dorey
BY
Joel B. Liberman
ATTORNEYS

UNITED STATES PATENT OFFICE.

WILLIAM A. DOREY, OF NEWARK, OHIO, ASSIGNOR TO HOLOPHANE GLASS COMPANY, INC., OF NEW YORK, N. Y., A CORPORATION OF NEW JERSEY.

PROJECTION LENS.

1,410,898.  Specification of Letters Patent.  Patented Mar. 28, 1922.

Application filed August 24, 1920. Serial No. 405,608.

*To all whom it may concern:*

Be it known that I, WILLIAM A. DOREY, a citizen of the United States, and resident of Newark, in the county of Licking and State of Ohio, have invented certain new and useful Improvements in Projection Lenses, of which the following is a specification.

The object of the present invention is to create a plural lens of the Fresnel type in which the beam between and beyond the lenses will be continuous and without gaps, throughout its cross section. An objectionable feature in plural lenses of the Fresnel type has been the dark bands in such beams and the present construction avoids them altogether as hereinafter explained.

The present invention is especially adapted for the manufacture of condenser lenses for use with incandescent lamps in motion picture projectors where such dark bands are serious drawbacks but it is likewise applicable to all classes of lenses where the problem arises.

The figure is a sectional view through a condenser lens embodying the system in which a light source 1, (shown as a point of light) sends its divergent rays to one lens 2, and the rays are refracted to the second lens 3 and again refracted in the manner shown as a concentrated cone of light to the other focus 4. The front face 5 of lens 2 is a continuous convex surface. The rear face of lens 2 consists of a series of annular convex surfaces 6 joined together by conoidal surfaces 7. The front face of lens 3 consists of a series of annular convex surfaces 8 joined together by conoidal surfaces 9. The rear face 10 of lens 3 is a continuous convex surface. Light rays such as 11 proceeding from the focus 1 and incident on surface 5 of lens 2 are refracted so that when within the glass as at 12 they are less divergent. Surfaces 6 are so formed that they are normal to rays such as 12. Surfaces such as 7 are so formed that they are parallel to rays such as 12, with the result that such rays will not be incident on surfaces 7 nor deviated by surfaces 6 but will be transmitted between lenses 2 and 3 in directions such as 13. It is evident that with this construction the interposition of surface 7 has not produced any gaps in the beam and that any other formation of surfaces 6 or 7 will produce gaps in the beam. Surfaces 8 on lens 3 are so formed that they will refract rays such as 13 in converging directions such as 14 within lens 3. Surfaces 9 are made parallel to the adjacent rays such as 14, but the interposition of such surfaces does not produce gaps in the beam as would other formation of such surfaces. The rear surface 10 of lens 3 is formed to refract such rays as 14 in directions such as 15 through the second focus 4.

The general construction shown in lens 2 and the general construction shown in lens 3 is known in the art but my invention covers the special arrangement of the annular surfaces on the rear face of the first lens in combination with the second lens adapted to eliminate the gaps in the projected beam which are obtained with ordinary lenses of the type shown at 2.

I claim:

1. A double condensing lens system, the first face of the first lens being convex and continuous, the second face of the first lens having a series of annular convex surfaces continuously normal to the elements of the refracted beam from the primary focus said surfaces being connected by conoidal surfaces parallel with the adjacent elements of the focal beam within the first lens, and the first surface of the second lens having a series of annular convex surfaces said surfaces being connected by conoidal surfaces parallel with the adjacent elements of the focal beam within the second lens, the second surface of the second lens being convex and continuous.

2. A double condensing lens system having the outer surface of each lens convex and continuous, and the inner faces having a series of annular corrugations facing each other and forming an air space in the lens, the corrugations of the inner face of the first lens having a convex element normal to the elements of the refracted beam from the primary focus connected by conoidal surfaces parallel with the adjacent elements of the focal beam within the first lens, and the corrugations of the inner face of the second lens having a convex element connected by conoidal surfaces parallel with the adjacent elements of the focal beam within the second lens.

Signed at Newark, in the county of Licking and State of Ohio, this 21st day of August, A. D. 1920.

WILLIAM A. DOREY.